June 4, 1929.　　　G. CONSTANTINESCO　　　1,715,816

DRIVING GEAR FOR MOTOR VEHICLES AND FOR OTHER PURPOSES

Filed March 17, 1927　　　2 Sheets-Sheet 1

Inventor
G. Constantinesco
by　Jn. Lowrie Atty.

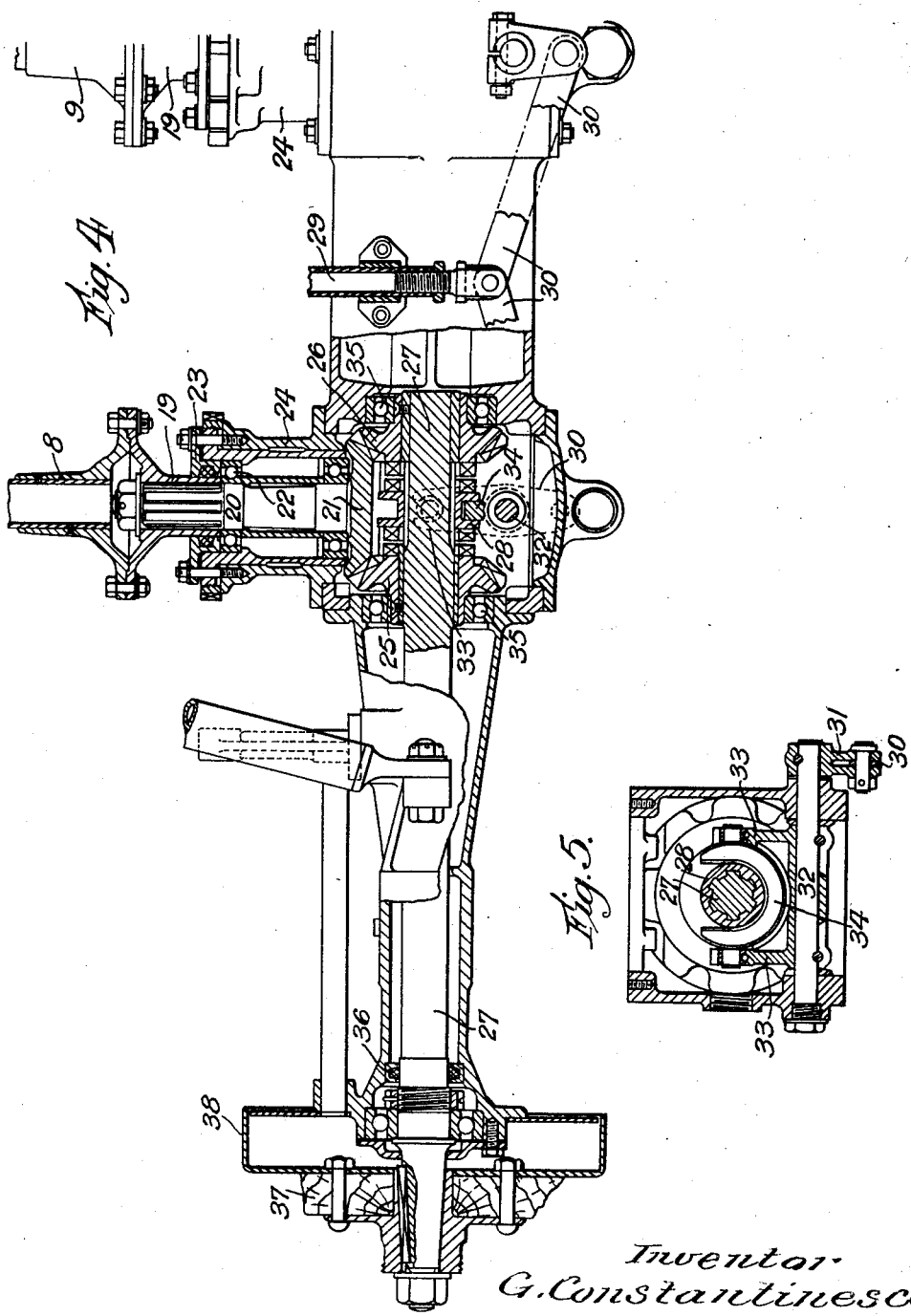

Patented June 4, 1929.

1,715,816

UNITED STATES PATENT OFFICE.

GEORGE CONSTANTINESCO, OF WEYBRIDGE, ENGLAND.

DRIVING GEAR FOR MOTOR VEHICLES AND FOR OTHER PURPOSES.

Application filed March 17, 1927, Serial No. 176,162, and in Great Britain March 26, 1926.

The invention relates to driving gear mainly for motor cars by which the usual differential gear is dispensed with.

It consists in driving each wheel of the axle of a motor vehicle independently by two shafts each of which received unidirectional impulses from a single engine driving one primary shaft. Alternating motions derived from this shaft are split between one or more oscillating masses and unidirectional driving mechanism which actuates the two independent shafts by power transmission means acting on the principle of the subject matter of my prior United States Patent No. 1,542,668. The invention, however, is applicable not only to motor vehicles but to any other purpose where it is desired to drive more than one shaft from a single engine.

The invention provides a method by which the engine may be kept running at a steady speed while two or more shafts automatically drive independently variable loads. For instance, all four wheels of a vehicle may be driven from one engine by this method, thereby dispensing with complicated differentials.

According to one embodiment of my invention the rear wheels are mounted independently and driven by reversing mitre gearing, each wheel having a gear to itself. The middle or driving pinion of each gear is mounted on a shaft, the two shafts being actuated preferably in opposite directions by separate unidirectional driving gears, each of which received a step by step motion from an oscillator. The oscillators are connected together by a rod so that they move together and one of them is driven from a prime mover through an inertia device on the principle explained in my prior specification above referred to.

In a modification, the oscillators may be stabilized for no load conditions by resilient or other suitable links, for example, they may be connected together by a spring link in addition to the above mentioned connecting rod.

The invention may be embodied in a great variety of forms of which the above are examples, and the arrangement may be made polyphase by multiplying the number of cranks in the prime mover and the unidirectional driving devices.

Referring to the accompanying drawings, which show embodiments of my invention:

Figures 4 and 5 are detail views of the back axle of a motor vehicle showing means for reversing.

Figure 1:
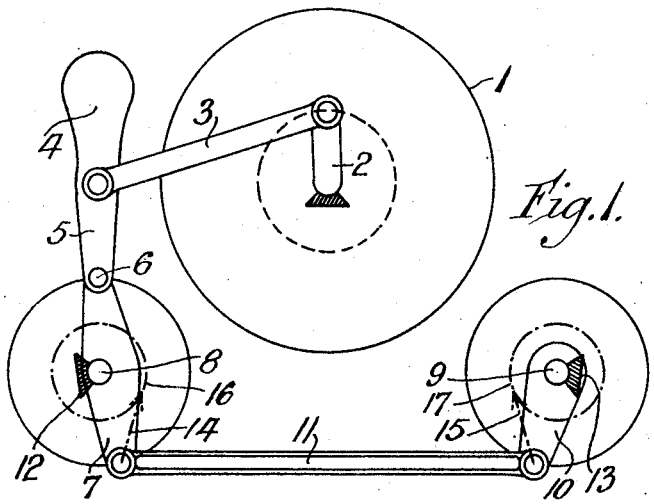
Figure 1 shows in diagram a form in which the oscillating members of the unidirectional driving devices are connected by a rod.

Referring to Figure 1, 1 represents in diagram the flywheel of an engine, not shown. 2 is the engine crank connected by a line 3 with a mass 4 which is thus oscillated. The mass 4 is carried on an arm 5 pivoted at 6 to a lever 7 which is loosely mounted on one of the driven shafts 8. The other driven shaft 9 carries an arm 10 loosely mounted upon it and connected to the lever 7 by a rod 11. The shafts 8 and 9 are parallel and are mounted in fixed bearings indicated diagrammatically at 12 and 13. The lever 7 and the arm 10 drive the shafts on which they are mounted unidirectionally by any suitable means indicated by arrows 14 and 15 which represent pawls acting on rotors 16 and 17. The motion of the prime mover is thus split between the oscillating mass and the driven shafts after the manner described in my prior specification above cited. If, for example, the torque on either shaft becomes excessive so that the lever 7 and the arm 10 cannot oscillate, the point 6 becomes fixed and the whole motion of the engine is absorbed by the inertial mass. If, on the contrary, there is no torque, the point 6 can move freely and the motion of the inertial mass is little or nothing. Intermediate torques produce intermediate results, the motion in all cases being split between the unidirectional devices and the inertial mass in proportions varying with the torque as fully described in my prior specification.

Figure 2:
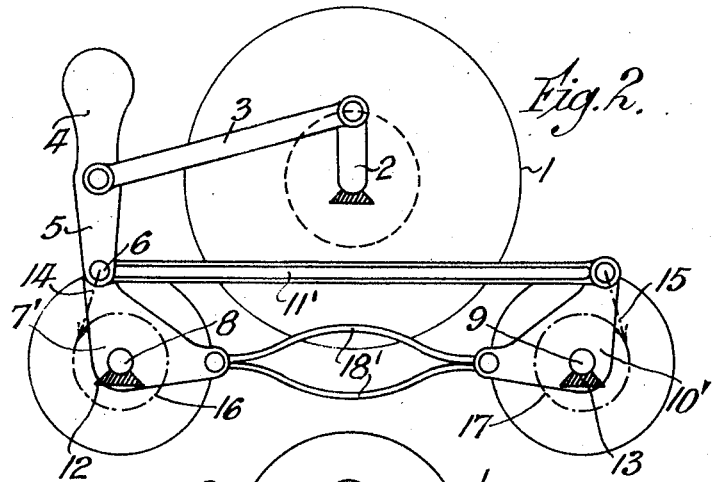
Figure 2 shows in diagram a modification in which the oscillating members are in addition connected by a spring link.

Figure 2 shows a modification in which corresponding parts are correspondingly numbered. The modification consists in connecting the lever corresponding to the lever 7 of Figure 1 and here shown as a bell crank lever 7' and the arm corresponding to the arm 10 of Figure 1 and here shown as a bell crank lever 10' by a spring 18' as well as by the connecting rod 11', the spring giving additional stability to the motion. The straight lever 7 and the arm 10 are replaced by bell-crank levers 7' and 10'.

Figure 3:
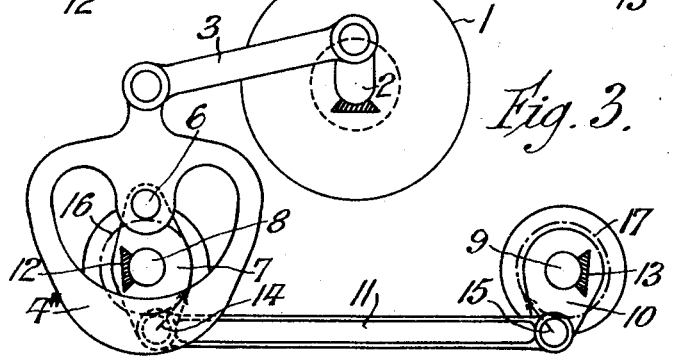
Figure 3 shows in diagram a device similar to that shown in Figure 1 with a modified form of inertial mass.

Figure 3 is a view similar to Figure 1, in which the inertial mass corresponding to the inertial mass 4 in Figure 1 and here indicated as 4″ is in different form and is differently mounted.

Figures 4 and 5 show the arrangement of, for example, the rear wheels of a car adapted for operation by the gearing above described. 8 and 9 are the twin shafts as before. They terminate in sleeves 19 within which are splined stub shafts 20 each of which carries a mitre-wheel 21. The sleeves are carried by ball bearings 22 and each sleeve is surrounded by a stuffing box 23 in the housing 24. The mitre wheel 21 gears with corresponding pinions 25 and 26 which are loose on the axle 27, either being brought into driving engagement for forward or reverse drive with the axle 27 by a sliding clutch member 28 which is splined on the axle. Both clutch members are actuated from the same central rod 29 by links 30 disposed toggle-wise. The mechanism for actuating the clutch members 28 is shown more particularly in Figure 5. Each link 30 is connected to a lever 31 which is mounted on a shaft 32 carrying a pair of arms 33. The arms engage with a half-collar 34 which is recessed into the clutch member 28. The axle 27 is mounted in ball bearings 35 and passes through a stuffing box 36 and it carries at its outer end the wheel 37 and brake drum 38 in the usual way.

It will be understood that the above described arrangements are illustrative only and may be modified in many ways. All four wheels may be independently driven by an obvious multiplication of the device.

What I claim is:—

1. Means for driving more than one shaft from a single prime mover comprising a plurality of shafts, a crank operated by the prime mover, oscillating members mounted loosely on the said shafts, means for operatively connecting the said oscillating members, driving means for causing each oscillating member to drive the shaft on which it is mounted unidirectionally, an inertial mass pivotally mounted on one of the oscillating members, and a link operatively connecting the said crank to a point on the mass other than the pivotal mounting, the whole being adapted to split the motion derived from the prime mover between the said driving means and the said shafts in proportions dependent on the torque on the latter.

2. Means for driving more than one shaft from a single prime mover comprising a pair of parallel shafts, a crank operated by the prime mover, oscillating members mounted loosely on the shafts, a rigid rod connecting the said oscillating members, driving means for causing each oscillating member to drive the shaft on which it is mounted unidirectionally, an inertial mass pivotally mounted on one of the oscillating members, and a link operatively connecting the said crank to a point on the mass other than the pivotal mounting, the whole being adapted to split the motion derived from the prime mover between the said driving means and the said shafts in proportions dependent on the torque on the latter.

3. Means for driving more than one shaft from a single prime mover comprising a pair of parallel shafts, a crank operated by the prime mover, oscillating members mounted loosely on the shafts, a rigid rod connecting the said oscillating members, a spring link connecting the oscillating members in addition to the said rigid rod, driving means for causing each oscillating member to drive the shaft on which it is mounted unidirectionally, an inertial mass pivotally mounted on one of the oscillating members, and a link operatively connecting the said crank to a point on the mass other than the pivotal mounting, the whole being adapted to split the motion derived from the prime mover between the said driving means and the said shafts in proportions dependent on the torque on the latter.

4. Driving device for motor vehicles comprising a driving axle in two co-axial parts, two parallel shafts, mitre gearing connecting each of said parts with one of the two parallel shafts, each mitre gearing comprising a driving wheel on one of the parallel shafts, two driven wheels loosely mounted on the corresponding axle part, and a clutch member splined on the said axle part and adapted to be brought alternatively into engagement with one or other of the said driven wheels for reversing, a prime mover, a crank operated by the prime mover, oscillating members mounted loosely on the shafts, a rigid rod connecting the said oscillating members, driving means for causing each oscillating member to drive the shaft on which it is mounted unidirectionally, an inertial mass pivotally mounted on one of the oscillating members, and a link operatively connecting the said crank to a point on the mass other than the pivotal mounting, the motion derived from the prime mover being split between the said driving means and the said shafts in proportions dependent on the torque on the latter.

5. Driving devices for motor vehicles comprising a driving axle in two co-axial parts, two parallel shafts, mitre gearing connecting each of said parts with one of the two parallel shafts, each mitre gearing comprising a driving wheel on one of the parallel shafts, two driven wheels loosely mounted on the corresponding axle part, and a clutch member splined on the said axle part and adapted to be brought alternatively into engagement with one or the other of the said driven wheels for reversing, a prime mover, a crank operated by the prime mover, oscillating members mounted loosely on the shafts, a rigid rod connecting the said oscillating members, a spring link connecting the oscillating members in addition to the said rigid rod, driving means for causing each oscillating member to drive the shaft on which it is mounted unidirectionally, an inertial mass pivotally mounted on one of the oscillating members, and a link operatively connecting the said crank to a point on the mass other than the pivotal mounting, the motion derived from the prime mover being split between the said driving means and the said shafts in proportions dependent on the torque on the latter.

In testimony that I claim the foregoing as my invention I have signed my name this eighteenth day of February, 1927.

GEORGE CONSTANTINESCO.